US011960513B2

(12) United States Patent
Lee (10) Patent No.: US 11,960,513 B2
(45) Date of Patent: Apr. 16, 2024

(54) USER-CUSTOMIZED QUESTION-ANSWERING SYSTEM BASED ON KNOWLEDGE GRAPH (71) Applicant: SALTLUX INC., Seoul (KR)

(72) Inventor: Kyung Il Lee, Seoul (KR)

(73) Assignee: Saltlux Inc., Seoul (KR)

(*) Notice: Subject to any disclaimer, the term of this patent is extended or adjusted under 35 U.S.C. 154(b) by 71 days.

(21) Appl. No.: 17/697,614

(22) Filed: Mar. 17, 2022

(65) Prior Publication Data

US 2022/0207067 A1 Jun. 30, 2022

Related U.S. Application Data (63) Continuation of application No. PCT/KR2019/013713, filed on Oct. 18, 2019.

(30) Foreign Application Priority Data

Sep. 18, 2019 (KR) .................. 10-2019-0114970

(51) Int. Cl.
G06F 16/332 (2019.01)
G06F 16/33 (2019.01)
G06F 16/35 (2019.01)

(52) U.S. Cl.
CPC ...... G06F 16/3329 (2019.01); G06F 16/3344 (2019.01); G06F 16/35 (2019.01)

(58) Field of Classification Search
CPC .................. G06F 16/3344; G06F 16/3329
See application file for complete search history.

(56) References Cited

U.S. PATENT DOCUMENTS 10,380,169 B2  8/2019  Venkataraman et al.
2017/0109355 A1  4/2017  Li et al.
(Continued)

FOREIGN PATENT DOCUMENTS

KR  10-2016-0103911 A  9/2016
KR  10-1835345 B1  3/2018
(Continued)

OTHER PUBLICATIONS

International Search Report and Written Opinion dated Jun. 17, 2020 in International Application No. PCT/KR2019/013713. (English translation of ISR.).
(Continued)

Primary Examiner — Van H Oberly
(74) Attorney, Agent, or Firm — Knobbe, Martens, Olson & Bear, LLP (57) ABSTRACT This application relates to a user-customized question-answering system based on a knowledge graph that can answer questions accurately. In one aspect, the system includes a user interface configured to receive a question or a reply in the form of a natural language from a user and transmit an answer or reverse question to the user, through a network, and a natural language understanding unit configured to perform natural language analysis and question classification. The system may also include an integrated knowledge graph configured to store or manage a knowledge graph including multi-order relationship triples and a knowledge graph management unit configured to generate a context knowledge graph having entity knowledge graphs and select at least one entity knowledge graph from among the entity knowledge graphs. The system may further include a question target ranking unit configured to generate the answer or the reverse question for the question.

7 Claims, 6 Drawing Sheets (56) References Cited

U.S. PATENT DOCUMENTS

2019/0034780 A1* 1/2019 Marin ................. G06F 16/3329
2020/0242444 A1* 7/2020 Zhang .................. G06F 16/367

FOREIGN PATENT DOCUMENTS

| KR | 10-2019-0034490 A | 4/2019 |
| KR | 10-1987915 B1 | 6/2019 |
| WO | WO 2017/150820 A1 | 9/2017 |

OTHER PUBLICATIONS

Office Action dated Nov. 21, 2020 in Korean Application No. 10-2019-0114970.
Notice of Allowance dated May 7, 2021 in Korean Application No. 10-2019-0114970.

* cited by examiner

USER-CUSTOMIZED QUESTION-ANSWERING SYSTEM BASED ON KNOWLEDGE GRAPH

CROSS REFERENCE TO RELATED APPLICATIONS

The present application a continuation application of International Patent Application No. PCT/KR2019/013713, filed on Oct. 18, 2019, which claims priority to Korean patent application No. 10-2019-0114970 filed on Sep. 18, 2019, contents of each of which are incorporated herein by reference in their entireties.

BACKGROUND

Technical Field

The present disclosure relates to a question-answering system, and more particularly, to a question-answering system capable of performing customized question-answering (QA) based on a knowledge graph.

Description of Related Technology

A question answering system analyzes a natural language question of a user, analyzes a correct answer type based on a result of the analysis, and generates numerous correct answer candidates through document searches based on core keywords in the question and knowledge base. Such an existing question-answering system answers the question by ranking correct answer candidates that are closest to correct answer type and limitation information demanded by the question and the context of the question and inferring one with the highest ranking as a correct answer.

SUMMARY

The present disclosure provides a customized question-answering system based on a knowledge graph capable of answering questions accurately.

According to an aspect of the present disclosure, question-answering system includes a user interface configured to receive a question or a reply in the form of a natural language from a user and transmit an answer or reverse question to the user, through a network; a natural language understanding unit configured to perform natural language analysis and question classification for the question; an integrated knowledge graph configured to store or manage a knowledge graph including multi-order relationship triples; a knowledge graph management unit configured to generate a context knowledge graph having entity knowledge graphs including first-order relationship triples extracted from the integrated knowledge graph by using a result of the natural language analysis for the question and select at least one entity knowledge graph from among the entity knowledge graphs included in the context knowledge graph by using a result of the question classification; and a question target ranking unit configured to generate the answer or the reverse question for the question from the at least one entity knowledge graph selected above.

The natural language understanding unit may include a natural language analyzing unit configured to provide a natural language analysis result for the question; and a question classifying unit configured to classify the question by obtaining a property to be obtained from the question by referring to the natural language analysis result for the question.

The knowledge graph management unit may include a context knowledge graph generating unit configured to extract the entity knowledge graphs including first-order relationship triples using entities of the question as subjects obtained from the natural language analysis result for the question and generate a context knowledge graph including the entity knowledge graphs; and a knowledge graph inquiring unit configured to select at least one entity knowledge graph from among entity knowledge graphs included in the context knowledge graph by using a property to be obtained from the question, which is a question classification result for the question.

The question-answering system may further include a user knowledge graph configured to store a user entity knowledge graph, which is an entity knowledge graph used to generate the answer to be transmitted to the user from among the at least one entity knowledge graph selected above.

When one entity knowledge graph is selected by the knowledge graph management unit, the question target ranking unit may generate the answer from the one entity knowledge graph.

When two or more entity knowledge graphs are selected by the knowledge graph management unit, the question target ranking unit may determine existence of the two or more entity knowledge graphs in the user entity knowledge graph stored in the selected user knowledge graph.

When none of the two or more entity knowledge graphs exists in the user entity knowledge graph stored in the selected user knowledge graph, the question target ranking unit may select the two or more entity knowledge graphs as entity knowledge graphs to be ranked and generate the answer or the reverse question for the question. When at least two of the two or more entity knowledge graphs exist in the user entity knowledge graph stored in the selected user knowledge graph, the question target ranking unit may select the at least two entity knowledge graphs as entity knowledge graphs to be ranked and generate the answer or the reverse question for the question. When only one of the two or more entity knowledge graphs exists in the user entity knowledge graph stored in the selected user knowledge graph, the question target ranking unit may generate the answer for the question from the one user entity knowledge graph.

The question target ranking unit may compare the selected ranking target entity knowledge graphs and determine whether there is an exclusive triple existing in only one entity knowledge graph. When an entity knowledge graph having the exclusive triple has one exclusive triple, the question target ranking unit may generate the reverse question from the one exclusive triple. When the entity knowledge graph having the exclusive triple has two or more exclusive triples, the question target ranking unit may generate the reverse question from an exclusive triple having a high frequency of existence in the integrated knowledge graph or having more objects having triple relationships. When there is no entity knowledge graph having the exclusive triple, the question target ranking unit may generate the reverse question from an overlapping triple having a high frequency of existence in the integrated knowledge graph or having more objects having triple relationships.

When there are overlapping triples having an object that is the same answer for properties to be obtained from the question, which is a result of the question classification performed by the natural language understanding unit, from among overlapping triples shared by the selected entity knowledge graphs to be ranked, the question target ranking unit may generate the object, which is the same answer, as the answer.

Each of the entity knowledge graphs may use each of entities obtained from the natural language analysis result for the question as a subject to indicate a first-order relationship with respect to another entity, which is an object, as a triple having the subject-property-object structure.

When a question-answering system according to the present invention fails to derive an answer, that is, a correct answer with high reliability through the initial question of a user, the question-answering system may inquire the user 10 by generating a reverse question by using a context knowledge graph before providing an answer for the corresponding question to the user, thereby improving reliability of an answer to be provided to the user, that is, a correct answer for the question.

DETAILED DESCRIPTION

Keywords or information in a question are often insufficient and a small number of correct answer candidates against inference of a correct answer are frequently inferred as correct answers, the reliability of the correct answer cannot be guaranteed.

Hereinafter, example embodiments will be described in detail with reference to the accompanying drawings. Example embodiments are provided to more fully explain the disclosure to one of ordinary skill in the art. The disclosure may include various embodiments and modifications, and embodiments thereof will be illustrated in the drawings and will be described herein in detail. However, this is not intended to limit the disclosure to particular modes of practice, and it is to be appreciated that all changes, equivalents, and substitutes that do not depart from the spirit and technical scope of the disclosure are encompassed in the disclosure. Like reference numerals are used for similar elements in describing each drawing.

The terms used in the present specification are merely used to describe particular embodiments, and are not intended to limit the disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meaning as commonly understood by one of ordinary skill in the art to which the disclosure belongs. Terms identical to those defined in commonly used dictionaries should be interpreted as having a meaning consistent with the meaning in the context of the related art and are not to be interpreted as ideal or overly formal in meaning unless explicitly defined in the present application.

In the drawings and descriptions below, a component indicated or described as one block may be a hardware block or a software block. For example, the components may be independent hardware blocks that transmits and receives signals with each other or may be software blocks executed on one processor.

To fully understand the configuration and effect of the present disclosure, preferred embodiments of the present disclosure will be described with reference to the accompanying drawings.

Figure 1:
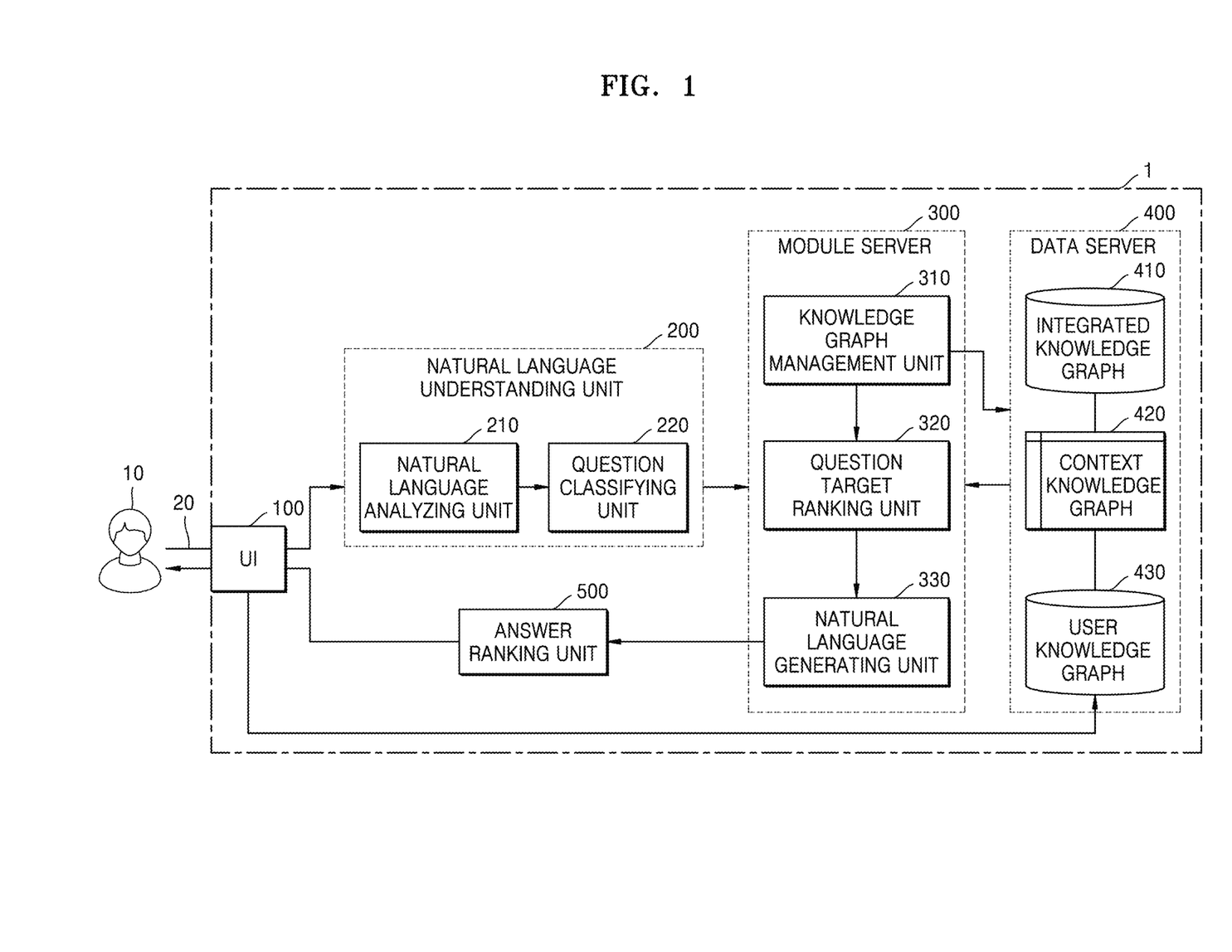
FIG. 1 is a block diagram showing the main configuration of a customized question-answering system based on a knowledge graph according to an example embodiment of the present disclosure.

FIG. 1 is a block diagram showing the main configuration of a customized question-answering system based on a knowledge graph according to an example embodiment of the present disclosure.

Referring to FIG. 1, a customized question-answering system 1 based on a knowledge graph (hereinafter referred to as a question-answering system) includes a user interface (UI) 100 that receives a question in the form of a natural language from a user 10 and transmits an answer, through a network 20.

The network 20 may include all types of networks through which data may be transmitted and received, e.g., a wired Internet service, a local area network (LAN), a wide area network (WAN), an intranet, a wireless Internet service, a mobile computing service, a wireless data communication service, a wireless Internet access service, a satellite communication service, a wireless LAN, Bluetooth, etc. When the network 20 is connected to a smartphone or a tablet PC, the network 20 may be a wireless data communication service, such as 3G, 4G, or 5G, a wireless LAN like Wi-Fi, or Bluetooth.

An UI 100 may provide an interface for accessing the question-answering system 1 through a terminal used by the user 10. The user 10 may transmit a reply for a question and a reverse question to the question-answering system 1 through the UI 100 and receive a reverse question and a reply for a question provided by the question-answering system 1 through the UI 100.

In this specification, unless otherwise specified, a 'question' refers to a question transmitted by the user 10 to the question-answering system 1 to obtain a correct answer from the question-answering system 1, and a 'reverse question' refers to a question that the question-answering system 1 transmits to the user 10 to accurately understand the 'question' of the user 10.

Also, in this specification, unless otherwise specified, an 'answer' refers to an answer that is inferred by the question-answering system 1 as a correct answer for a question of the user 10 and transmitted to the user 10 by the question-answering system 1, and a 'reply' (i.e., a reply to a reverse question) refers to an answer transmitted by the user 10 to the question-answering system 1 for a reverse question transmitted from the question-answering system 1.

The question answering system 1 further includes a natural language understanding unit 200 capable of analyzing a question in the form of a natural language received by the UI 100 and a module server 300 that manages questions analyzed by the natural language understanding unit 200 and generates an answer or a reverse question for a question by using the data server 400.

The natural language understanding unit 200 may include a natural language analyzing unit 210 and a question classifying unit 220.

The natural language analyzing unit 210 may provide a natural language analysis result for a question of the user 10 as structured data having a table structure or a tree structure. Structured data that may be provided by the natural language analyzing unit 210 may be, for example, RDB (Relation DateBase), CSV (Comma-Seperated Variables), XML (eXtensible Markup Language), or JSON (JavaScript Object Notation), but the present disclosure is not limited thereto.

The natural language analyzing unit 210 may separate a sentence constituting a question of the user 10 in the form of a natural language into morphemes and perform syntax analysis and entity name analysis on the sentence constituting the question separated into morphemes. Also, the natural language analyzing unit 210 may generate a simplified sentence by removing unnecessary features from the sentence constituting the question, classify intention and analyze domain of the question to which a semantic role is labeled based on a generated simplified sentence, and label a semantic role for the sentence constituting the question. The natural language analyzing unit 210 will be described below in detail with reference to FIG. 2.

The question classifying unit 220 classifies the question of the user 10 with reference to a natural language analysis result regarding the question of the user 10 in the form of a natural language performed by the natural language analyzing unit 210. For example, the question classifying unit 220 may classify the question of the user 10, thereby obtaining a property to be obtained from the question of the user 10. The property may also be referred to as a predicate.

The question classifying unit 220 may classify, for example, that a question 'what is the age of Yi Sun-shin?' is to obtain an age property of a person and classify that a question 'what is the height of Mt. Baekdu?' is to obtain a height property of an object. In other words, the question classifying unit 220 may classify which property to search for in a triple of knowledge graphs in the form of subject-property-object.

The module server 300 may include a knowledge graph management unit 310, a question target ranking unit 320, and a natural language generating unit 330. The data server 400 may include an integrated knowledge graph 410 and a user knowledge graph 430. The data server 400 may store a context knowledge graph 420 generated by the knowledge graph management unit 310 with reference to the integrated knowledge graph 410.

The knowledge graph management unit 310 may manage and update the integrated knowledge graph 410. In some embodiments, the integrated knowledge graph 410 may have a space for storing a knowledge graph built within the question-answering system 1. The integrated knowledge graph 410 may have a space for storing data in any form, such as NoSQL, a relational database, or a file system. The integrated knowledge graph 410 may have one logically divided storage device, a division unit that logically separates one or a plurality of storage devices, or a portion of one physically divided storage device or one logically divided storage device.

In some other embodiments, the integrated knowledge graph 410 may be a management module that is connected to at least one knowledge graph built outside the question-answering system 1 through the network 20 and manage the at least one knowledge graph built outside the question-answering system 1. In some other embodiments, the integrated knowledge graph 410 may have a management module that integrates and manages a space for storing knowledge graphs built inside the question-answering system 1 with the at least one knowledge graph built outside the question-answering system 1.

A knowledge graph refers to a semantic graph, that is, a graph representing a semantic graph between entities in order to accumulate semantic information from various sources to improve search results. Semantic information refers to a relationship between resources expressed into information in a certain form. In other words, a knowledge graph indicates that semantic information is collected and data thereof is stored in the form of a graph.

A knowledge graph may be built by using, for example, a resource description framework (RDF). The RDF includes a model, a language, and a grammar for describing properties, characteristics, and relationships of all resources (web pages, images, videos, etc.) having uniform resource identifiers (URIs) and is a graph-type data model. The RDF expresses a relationship between two resources, that is, a subject and an object, and a property or a predicate describes features and characteristics of the relationship. A sentence having a subject-property-object structure is referred to as a triple, and a relationship therebetween may have directionality.

For example, a knowledge graph may include a multi-order relationship triple in which indication of a relationship between one entity and another entity as a triple having a subject-property-object structure by using the one entity as a subject and the other entity as an object and indication of a relationship between the other entity and yet another entity as a triple having the subject-property-object structure by using the other entity as the subject and the yet other entity as the object are repeated.

The knowledge graph management unit 310 may generate the context knowledge graph 420 from the integrated knowledge graph 410 by using entities of a question of the user 10 extracted and analyzed by the natural language understanding unit 200. The context knowledge graph 420 may be generated by cutting out only first-order relationship triples from the integrated knowledge graph 410 based on the entities of an extracted question of the user 10. In other words, the context knowledge graph 420 may include first-order relationship triples that use each of entities of an extracted question of the user 10 as a subject to indicate a relationship with respect to another entity, which is an object, as a triple having the subject-property-object structure.

In the present specification, for convenience of explanation, a first-order relationship triple generated based on one entity is referred to as an entity knowledge graph, and all of entity knowledge graphs generated from entities of the question of the user 10 or a space in which entity knowledge graphs are stored is referred to as the context knowledge graph 420. In other words, the context knowledge graph 420 for one question of the user 10 may include entity knowledge graphs respectively generated from entities extracted from the one question of the user 10.

In the user knowledge graph 430, from among context knowledge graphs 420, an entity knowledge graph used in response to the question of the user 10 may be stored. The user knowledge graph 430 may store a plurality of entity knowledge graphs used for answers as questions of the user 10 are repeated. Entity knowledge graphs stored in the user knowledge graph 430 may be referred to as user entity knowledge graphs.

Separately, the knowledge graph management unit 310 may generate a query regarding a question of the user 10 by using a result of classification for questions of the user 10 by the question classifying unit 220, that is, a property to be obtained from the question of the user 10. A 'query' refers to a computer language used to request information retrieval.

The context knowledge graph 420 may receive a query for a question of the user 10 generated by the knowledge graph management unit 310 and transmit at least one entity knowledge graph corresponding to the query for the question of the user 10 from among a plurality of entity knowledge graphs included in the context knowledge graph 420 and a plurality of user entity knowledge graphs included in the user knowledge graph 430 to the knowledge graph management unit 310.

The question target ranking unit 320 may generate an answer or a reverse question for the question of the user 10 by using the at least one entity knowledge graph corresponding to the question of the user 10.

The natural language generating unit 330 may generate an answer or a reverse question for the question of the user 10 generated by the question target ranking unit 320 in the form of a natural language. In some embodiments, the natural language generating unit 330 may generate an answer or a reverse question for the question of the user 10 as a plurality of candidates in various expressions in the form of a natural language.

In some embodiments, the question-answering system 1 may further include an answer ranking unit 500. After the answer ranking unit 500 determines a ranking for a plurality of candidates, in the form of a natural language, of an answer or a reverse question for the question of the user 10 generated by the natural language generating unit 330, the answer ranking unit 500 may select a candidate with a high ranking and provide the selected candidate as an answer or a reverse question to the user 10 through the UI 100.

The user 10 may transmit a reply for a reverse question to the question-answering system 1 through the UI 100, and the question-answering system 1 may synthesize the question of the user 10 with the reply for the reverse question and provide an answer to the user 10 or provide another reverse question by repeating the above-stated steps.

An entity knowledge graph used to generate an answer provided to the user 10 may be stored in the user knowledge graph 430.

When the question-answering system 1 according to the present invention fails to derive an answer, that is, a correct answer with high reliability through the initial question of the user 10, the question-answering system 1 may inquire the user 10 by generating a reverse question before providing an answer for the corresponding question to the user 10, thereby improving reliability of an answer to be provided to the user 10, that is, a correct answer for the question.

Figure 2:
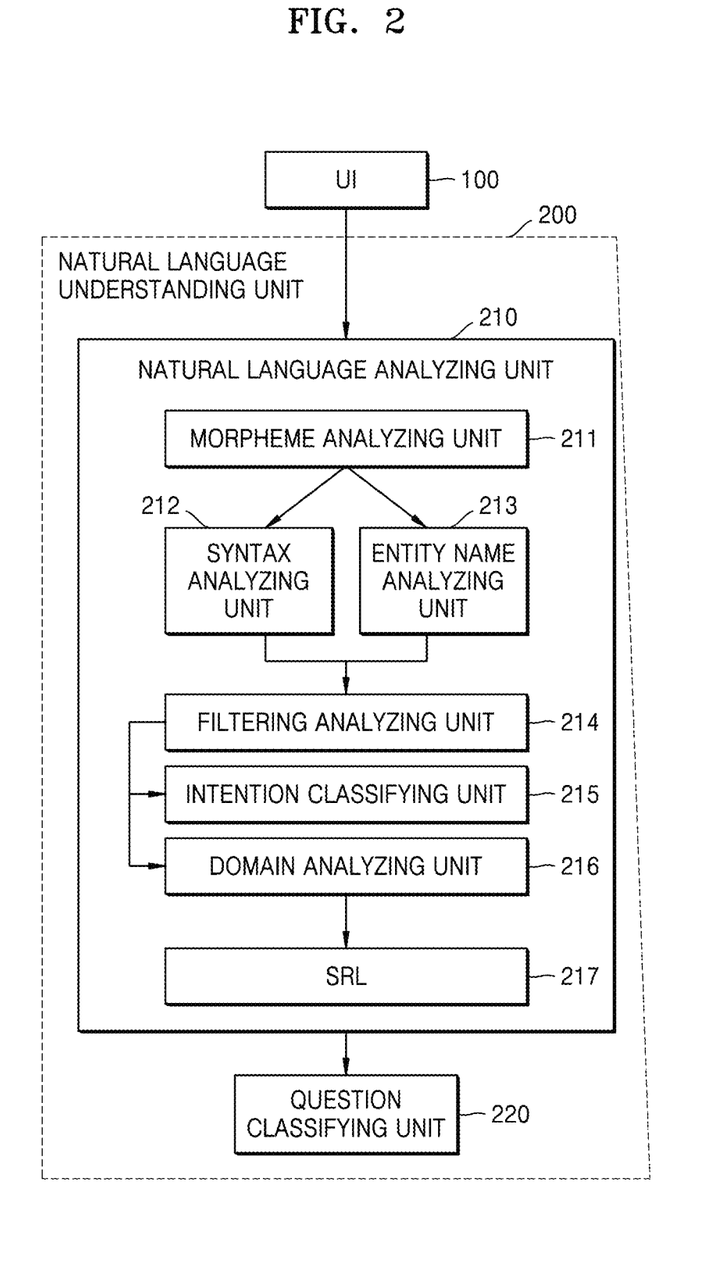
FIG. 2 is a block diagram showing the main configuration of a natural language understanding unit of a customized question-answering system based on a knowledge graph according to an example embodiment of the present disclosure.

FIG. 2 is a block diagram showing the main configuration of a natural language understanding unit of a customized question-answering system based on a knowledge graph according to an example embodiment of the present disclosure.

Referring to FIG. 2, the natural language understanding unit 200 may include a natural language understanding unit 210 that interprets a question in the form of a natural language received by the UI 100. The natural language understanding unit 210 may include a morpheme analyzing unit 211, a syntax analyzing unit 212, an entity name analyzing unit 213, a filtering analyzing unit 214, an intention classifying unit 215, a domain analyzing unit 216, and a semantic role labeling unit (SRL) 217.

The morpheme analyzing unit 211 may separate a sentence constituting a question into morphemes. The syntax analyzing unit 212 and the entity name analyzing unit 213 may perform syntax analysis and entity name analysis on the sentence that constitutes the question and is separated into morphemes. The filtering analyzing unit 214 may generate a simplified sentence by removing unnecessary features from the sentence constituting the question. The intention classifying unit 215 and the domain analyzing unit 216 may perform intention classification and domain analysis for the question to which a semantic role is assigned based on the simplified sentence generated by the filtering analyzing unit 214. The SRL 217 may assign a semantic role to the sentence constituting the question.

Figure 3:
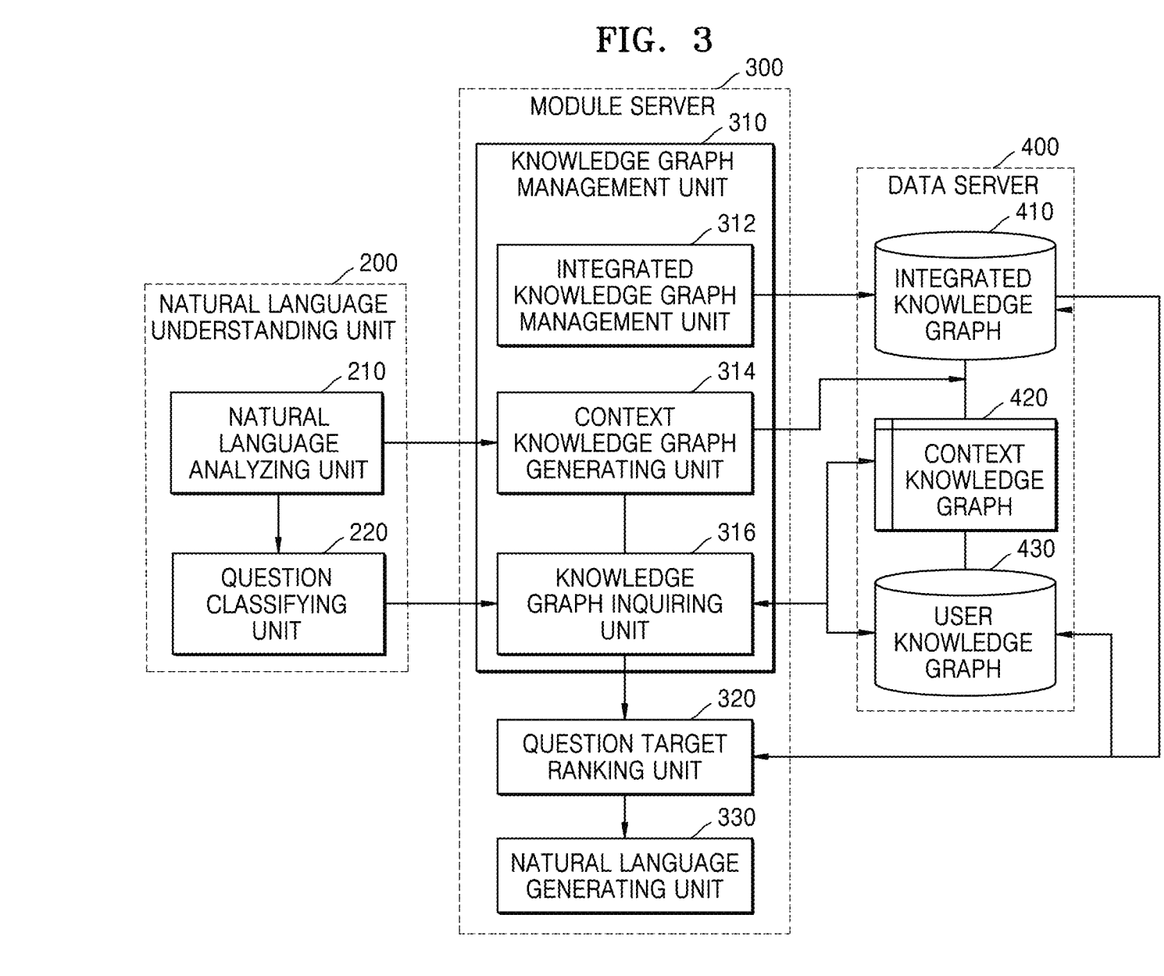
FIG. 3 is a block diagram showing the main configuration of a knowledge graph management unit of a customized question-answering system based on a knowledge graph according to an example embodiment of the present disclosure.

FIG. 3 is a block diagram showing the main configuration of a knowledge graph management unit of a customized question-answering system based on a knowledge graph according to an example embodiment of the present disclosure.

Referring to FIG. 3, the natural language understanding unit 200 may include the natural language analyzing unit 210 and the question classifying unit 220. The module server 300 may include the knowledge graph management unit 310, the question target ranking unit 320, and the natural language generating unit 330. The data server 400 may include the integrated knowledge graph 410, the context knowledge graph 420, and the user knowledge graph 430.

The knowledge graph management unit 310 may include an integrated knowledge graph management unit 312, a context knowledge graph generating unit 314, and a knowledge graph inquiring unit 316.

The integrated knowledge graph management unit 312 may manage and update the integrated knowledge graph 410. In some embodiments, the integrated knowledge graph 410 may have a space for storing a knowledge graph built within a question-answering system (1 of FIG. 1). The integrated knowledge graph 410 may have a space for storing data in any form, such as NoSQL, a relational database, or a file system. The integrated knowledge graph 410 may have one logically divided storage device, a division unit that logically separates one or a plurality of storage devices, or a portion of one physically divided storage device or one logically divided storage device.

In some other embodiments, the integrated knowledge graph 410 may be a management module that is connected to at least one knowledge graph built outside a question-answering system (1 of FIG. 1) through a network (20 of FIG. 1) and manage the at least one knowledge graph built outside the question-answering system (1 of FIG. 1). In some other embodiments, the integrated knowledge graph 410 may have a management module that integrates and manages a space for storing knowledge graphs built inside a question-answering system (1 of FIG. 1) with the at least one knowledge graph built outside the question-answering system (1 of FIG. 1).

The context knowledge graph generating unit 314 may generate the context knowledge graph 420 from the integrated knowledge graph 410 by using entities of a question of a user (10 of FIG. 1) extracted and analyzed by the natural language analyzing unit 210. The context knowledge graph 420 may be generated by cutting out only first-order relationship triples from the integrated knowledge graph 410 based on the entities of an extracted question of the user 10. In other words, the context knowledge graph 420 may include entity knowledge graphs, which are first-order relationship triples that use each of entities of an extracted question of the user 10 as a subject to indicate a relationship with respect to another entity, which is an object, as a triple having the subject-property-object structure.

The knowledge graph inquiring unit 316 may generate a query regarding a question of the user 10 by using a result of classification for questions of the user 10 by the question classifying unit 220, that is, a property to be obtained from the question of the user 10.

The context knowledge graph 420 may receive a query for the question of the user 10 generated by the knowledge graph question unit 316 and transmit at least one entity knowledge graph corresponding to the query for the question of the user 10 from among a plurality of entity knowledge graphs included in the context knowledge graph 420 to the knowledge graph management unit 310.

The question target ranking unit 320 may generate an answer or a reverse question for the question of the user 10 by using the at least one entity knowledge graph corresponding to the question of the user 10.

The natural language generating unit 330 may generate an answer or a reverse question for the question of the user 10 generated by the question target ranking unit 320 in the form of a natural language.

Figure 4:
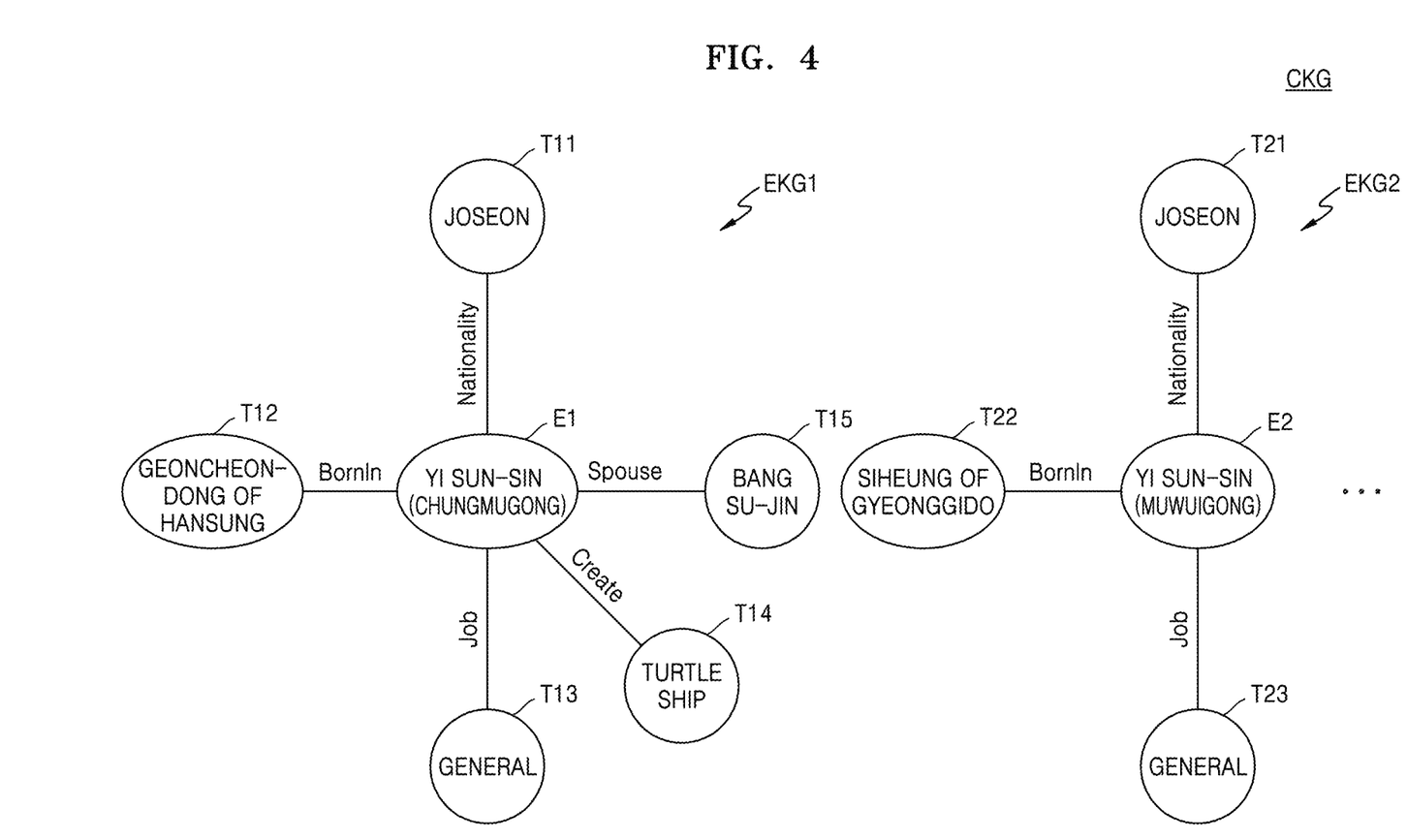
FIG. 4 is a schematic diagram showing an example of a context knowledge graph generated by a user-customized question-answering system based on a knowledge graph according to an example embodiment of the present disclosure.

FIG. 4 is a schematic diagram showing an example of a context knowledge graph generated by a user-customized question-answering system based on a knowledge graph according to an example embodiment of the present disclosure. In detail, FIG. 4 shows an example of a part of a context knowledge graph generated when a question of as user (10 of FIG. 1) is 'Where is the birthplace of Yi Sun-Sin?'.

Referring to FIGS. 3 and 4 together, when the question of the user (10 of FIG. 1) is 'Where is the birthplace of Yi Sun-Sin?', the natural language analyzing unit 210 may extract 'Yi Sun-Sin' and 'birthplace' as entities and transmit them to the context knowledge graph generating unit 314. The context knowledge graph generating unit 314 may extract a plurality of entity knowledge graphs EKG1 and EKG2, which are first-order relationship triples, by using each of 'Yi Sun-Sin' and 'birthplace' as a subject and at least one other entity having a first-order relationship (i.e., at least one entity having a property) as an object, thereby generating a context knowledge graph CKG. Although FIG. 4 shows only the context knowledge graph CKG in which first-order relationship triples use 'Yi Sun-Sin' as the subject, the context knowledge graph CKG may further include first-order relationship triples using 'birthplace' as the subject. The context knowledge graph CKG may correspond to the context knowledge graph 420 shown in FIG. 1.

When there is 'Yi Sun-Sin the Muwuigong' other than 'Yi Sun-Sin the Chungmugong', the context knowledge graph CKG may include a first entity knowledge graph EKG1, which is a first-order relationship triple using Yi Sun-Sin the Chungmugong E1 as the subject and a second entity knowledge graph EKG2, which is a first-order relationship triple using Yi Sun-Sin the Muwuigong E2 as the subject.

The first entity knowledge graph EKG1 may use the Yi Sun-Sin the Chungmugong E1 as the subject and may have objects respectively having first-order triple relationships T11, T12, T13, T14, and T15 with respect to properties like nationality (Nationality), birthplace (BornIn), job (Job), creation (Create), and spouse (Spouse). The second entity knowledge graph EKG2 may use the Yi Sun-Sin the Muwuigong E2 as the subject and may have objects respectively having first-order triple relationships T21, T22, and T23 with respect to properties like nationality (Nationality), birthplace (BornIn), and job (Job).

Figure 5:
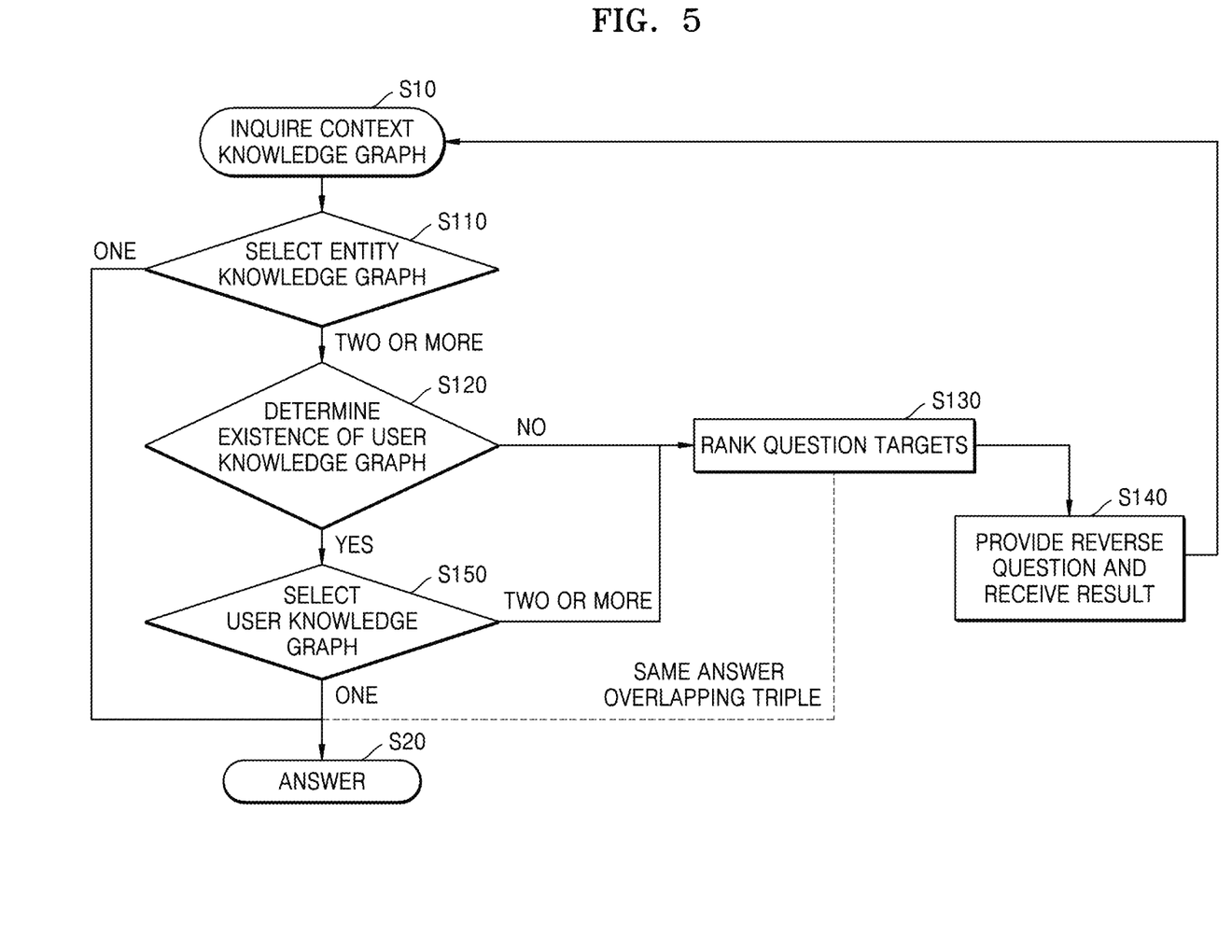
FIG. 5 is a flowchart showing a process that question-answering is performed based on a knowledge graph in a customized question-answering system based on a knowledge graph according to an example embodiment of the present disclosure.

FIG. 5 is a flowchart showing a process that question-answering is performed based on a knowledge graph in a customized question-answering system based on a knowledge graph according to an example embodiment of the present disclosure.

Referring to FIGS. 3 to 5 together, the question classifying unit 220 may classify 'birthplace', which is a property to be obtained by a question of a user (10 of FIG. 1) and transmit the same to the knowledge graph inquiring unit 316. The knowledge graph inquiring unit 316 may generate a query regarding the question of the user 10 by using 'birthplace' (BornIn), which is a result of classification, inquire the context knowledge graph CKG (operation S10), and select and receive entity knowledge graphs having the property 'bornin' with respect to 'Yi Sun-Sin', which is the subject, that is, the first entity knowledge graph EKG1 and the second entity knowledge graph EKG2 (operation S110). Here, the inquiring the context knowledge graph CKG (operation S10) means that a query, which is a computer language used for a request for information collection, is transmitted to the context knowledge graph CKG.

When the context knowledge graph CKG has only one entity knowledge graph (e.g., the first entity knowledge graph EKG1) having 'birthplace' (BornIn) as the property with respect to 'Yi Sun-Sin', which is the subject, Geoncheon-dong of Hansung T12, which is the 'birthplace' (BornIn) of Yi Sun-Sin the Chungmugong E1, may be inferred as a correct answer and provided to the user 10 (operation S20).

The question target ranking unit 320 determines the existence of the first entity knowledge graph EKG1 and the second entity knowledge graph EKG2 from among user entity knowledge graphs, which are included in the user knowledge graph 430 and used to answer previous questions of the user 10 (operation S120). When only the first entity knowledge graph EKG1 exists in the user knowledge graph 430, the first entity knowledge graph EKG1 may be selected from the user knowledge graph 430 (operation S150) and Geoncheon-dong of Hansung T12, which is the birthplace of Yi Sun-Sin the Chungmugong E1, may be inferred as a correct answer and provided to the user 10 as an answer (operation S20).

When neither the first entity knowledge graph EKG1 nor the second entity knowledge graph EKG2 exists in the user knowledge graph 430, the question target ranking unit 320 may determine a ranking for a question target with reference to the integrated knowledge graph 410 (operation S130), provide a reverse question to the user 10, and receive a result thereof (operation S140).

Figure 6:
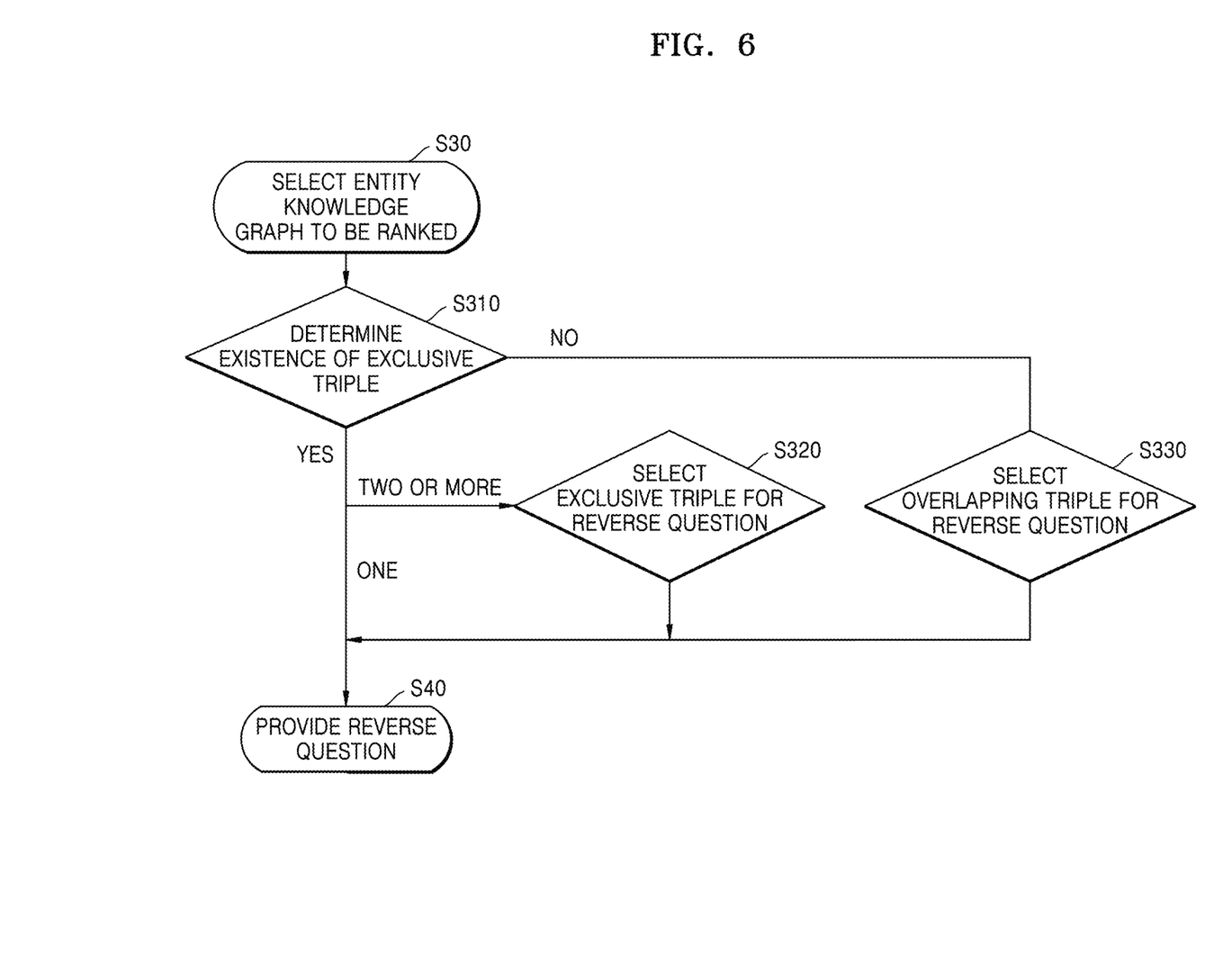
FIG. 6 is a flowchart for describing an operation of a question target ranking unit of a customized question-answering system based on a knowledge graph according to an example embodiment of the present disclosure.

FIG. 6 is a flowchart for describing an operation of a question target ranking unit of a customized question-answering system based on a knowledge graph according to an example embodiment of the present disclosure.

Referring to FIGS. 3 to 6 together, when the first entity knowledge graph EKG1 and the second entity knowledge graph EKG2 are selected as entity knowledge graphs to be ranked (operation S30), the question target ranking unit 320 compares the first entity knowledge graph EKG1 with the second entity knowledge graph EKG2 having the same property and determines whether there is an exclusive triple included in only one of the first entity knowledge graph EKG1 and the second entity knowledge graph EKG2 (operation S310).

While the first entity knowledge graph EKG1 and the second entity knowledge graph EKG2 have overlapping triples having objects having first-order triple relationships T11, T12, T13 and first-order triple relationships T21, T22, and T23 for the properties nationality, bornin, and job, only the first entity knowledge graph EKG1 has an exclusive triple having the object having first-order triple relationships T14 and T15 for the properties create and spouse. When there are two or more exclusive triples T14 and T15, an exclusive triple for a reverse question may be selected from the two or more exclusive triples T14 and T15 (operation S320). In some embodiments, as the exclusive triple for a reverse question, from among objects of the exclusive triples T14 and T15, one with a high frequency of existence in the integrated knowledge graph 410 may be selected. In some other embodiments, one having more objects having triple relationships for the objects of the exclusive triples T14 and T15 as the subject may be selected as an exclusive triple for a reverse question.

For example, when turtle ship T14 exists more frequently than Bang Su-Jin T15 in the integrated knowledge graph 410 or there are more objects having triple relationships using 'turtle ship' as the subject, an exclusive triple having turtle ship T14 as the property creation (Create) for the subject of Yi Sun-Sin the Chungmugong E1 may be selected as an exclusive triple for a reverse question (operation S320) and a reverse question may be provided to a user (10 of FIG. 1) (operation S40).

When there is no exclusive triple, although not shown as a separate triple in FIG. 4, it is assumed that there are separate triples for 'Chungmugong' and 'Muwuigong', which are artnames (Artname).

The first entity knowledge graph EKG1 and the second entity knowledge graph EKG2 may have overlapping triples having objects having first-order triple relationships T11, T12, T13, and 'Chungmugong' and first-order triple relationships T21, T22, T23, and 'Muwuigong' for properties of nationality (Nationality), birthplace (BornIn), job (Job), and artname (Artname). From among them, Joseon T11 and Joseon T2 and general T13 and general T23 have the same object, they are excluded from overlapping triple candidates for a reverse question, and Geoncheon-dong of Hansung T12 and Siheung of Gyeonggido T22 may be overlapping triple candidates for a reverse question. From between them, one with a high frequency of existence in the integrated knowledge graph 410 or one having more objects having triple relationships may be selected as an overlapping triple for a reverse question. For example, with respect to the property of artname (Artname) for Yi Sun-Sin the Chungmugong E1 as the subject, an overlapping triple corresponding to 'Chungmugong' may be selected as an overlapping triple for a reverse question (operation S330) and a reverse question may be provided to a user (10 of FIG. 1) (operation S40).

When a question of the user 10 is 'What is the job of Yi Sun-Sin?', there are overlapping triples having general T13 and general T23, which are the same answer for the property of job (Job) for subjects of Yi Sun-Sin the Chungmugong E1 and Yi Sun-Sin the Muwuigong E2. Therefore, in this case, 'general' may be inferred and provided to the user 10 as an answer without generating an overlapping triple for a reverse question.

Referring to FIGS. 1, 5, and 6 together, an answer provided to the user 10 (operation S20) or a reverse question provided to the user 10 (operation S40) may be generated in the form of a natural language by the natural language generating unit 330. At this time, the natural language generating unit 330 may generate an answer or a reverse question for the question of the user 10 as a plurality of candidates in various expressions in the form of a natural language. After the answer ranking unit 500 determines a ranking for a plurality of candidates, in the form of a natural language, of an answer or a reverse question for the question of the user 10 generated by the natural language generating unit 330, the answer ranking unit 500 may select a candidate with a high ranking and provide the selected candidate as an answer or a reverse question to the user 10 through the UI 100.

When the question-answering system 1 according to the present invention fails to derive an answer, that is, a correct answer with high reliability through the initial question of the user 10, the question-answering system 1 may inquire the user 10 by generating a reverse question by using a context knowledge graph before providing an answer for the corresponding question to the user 10, thereby improving reliability of an answer to be provided to the user 10, that is, a correct answer for the question.

The present disclosure has been described above in detail with reference to preferred embodiments. However, the present disclosure is not limited to the above embodiments, and various modifications and changes may be made therein by one of ordinary skill in the art within the technical spirit and scope of the present disclosure.

What is claimed is:

1. A question-answering system comprising:
    a user interface configured to receive a question or a reply in the form of a natural language from a user and transmit an answer or reverse question to the user, through a network;
    a natural language understanding unit configured to perform natural language analysis and question classification for the question;
    an integrated knowledge graph configured to store or manage a knowledge graph comprising multi-order relationship triples;
    a knowledge graph management unit configured to generate a context knowledge graph having entity knowledge graphs comprising first-order relationship triples extracted from the integrated knowledge graph by using a result of the natural language analysis for the question and select at least one entity knowledge graph from among the entity knowledge graphs included in the context knowledge graph by using a result of the question classification;
    a question target ranking unit configured to generate the answer or the reverse question for the question from the at least one entity knowledge graph selected above; and a user knowledge graph configured to store a user entity knowledge graph, which is an entity knowledge graph used to generate the answer to be transmitted to the user from among the at least one entity knowledge graph selected above, wherein, in response to two or more entity knowledge graphs being selected by the knowledge graph management unit, the question target ranking unit is configured to determine existence of the two or more entity knowledge graphs in the user entity knowledge graph stored in the selected user knowledge graph, and wherein, in response to none of the two or more entity knowledge graphs existing in the user entity knowledge graph stored in the selected user knowledge graph, the question target ranking unit is configured to select the two or more entity knowledge graphs as entity knowledge graphs to be ranked and generate the answer or the reverse question for the question, in response to at least two of the two or more entity knowledge graphs existing in the user entity knowledge graph stored in the selected user knowledge graph, the question target ranking unit is configured to select the at least two entity knowledge graphs as entity knowledge graphs to be ranked and generates the answer or the reverse question for the question, and in response to only one of the two or more entity knowledge graphs existing in the user entity knowledge graph stored in the selected user knowledge graph, the question target ranking unit is configured to generate the answer for the question from the one user entity knowledge graph.

2. The question-answering system of claim 1, wherein the natural language understanding unit comprises:
a natural language analyzing unit configured to provide a natural language analysis result for the question; and
a question classifying unit configured to classify the question by obtaining a property to be obtained from the question by referring to the natural language analysis result for the question.

3. The question-answering system of claim 2, wherein the knowledge graph management unit comprises:
a context knowledge graph generating unit configured to extract the entity knowledge graphs including first-order relationship triples using entities of the question as subjects obtained from the natural language analysis result for the question and generate a context knowledge graph comprising the entity knowledge graphs; and
a knowledge graph inquiring unit configured to select at least one entity knowledge graph from among entity knowledge graphs included in the context knowledge graph by using a property to be obtained from the question, which is a question classification result for the question.

4. The question-answering system of claim 1, wherein, in response to one entity knowledge graph being selected by the knowledge graph management unit, the question target ranking unit is configured to generate the answer from the one entity knowledge graph.

5. The question-answering system of claim 1, wherein, the question target ranking unit is configured to compare the selected entity knowledge graphs and determine whether there is an exclusive triple existing in only one entity knowledge graph,
in response to an entity knowledge graph having the exclusive triple having one exclusive triple, the question target ranking unit is configured to generate the reverse question from the one exclusive triple,
in response to the entity knowledge graph having the exclusive triple having two or more exclusive triples, the question target ranking unit is configured to generate the reverse question from an exclusive triple having a high frequency of existence in the integrated knowledge graph or having more objects having triple relationships, and,
in response to there being no entity knowledge graph having the exclusive triple, the question target ranking unit is configured to generate the reverse question from an overlapping triple having a high frequency of existence in the integrated knowledge graph or having more objects having triple relationships.

6. The question-answering system of claim 5, wherein, in response to there being overlapping triples having an object that is the same answer for properties to be obtained from the question, which is a result of the question classification performed by the natural language understanding unit, from among overlapping triples shared by the selected entity knowledge graphs to be ranked, the question target ranking unit is configured to generate the object, which is the same answer, as the answer.

7. The question-answering system of claim 1, wherein each of the entity knowledge graphs is configured to use each of entities obtained from the natural language analysis result for the question as a subject to indicate a first-order relationship with respect to another entity, which is an object, as a triple having the subject-property-object structure.

* * * * *